United States Patent [19]

Thoma et al.

[11] Patent Number: 5,283,485
[45] Date of Patent: Feb. 1, 1994

[54] SMALL-SIZE MOTOR AND A PROCESS FOR MANUFACTURE AND USE THEREOF

[75] Inventors: Peter Thoma, Hollern; Walter Kuffner, München, both of Fed. Rep. of Germany; Urs Portmann, Villars-sur-Glanes, Switzerland

[73] Assignees: Bayerische Motoren Werke AG, Munich, Fed. Rep. of Germany; Saia AG, Murten, Switzerland

[21] Appl. No.: 798,086

[22] Filed: Nov. 27, 1991

[30] Foreign Application Priority Data

Nov. 27, 1990 [EP] European Pat. Off. ...... 90122599.5

[51] Int. Cl.⁵ .................... H02K 5/10; H02K 37/00
[52] U.S. Cl. ................................. 310/49; 310/42; 310/40 MM
[58] Field of Search ............ 310/49 R, 88, 42, 43; 123/339, 350

[56] References Cited

U.S. PATENT DOCUMENTS

| | | | |
|---|---|---|---|
| 3,506,898 | 4/1970 | Gowren | 310/43 |
| 4,414,942 | 11/1983 | Itoh et al. | 123/339 |
| 4,795,930 | 1/1989 | Schwartz et al. | 310/49 R |
| 4,900,968 | 2/1990 | Feigel et al. | 310/260 |
| 5,073,735 | 12/1991 | Takagi | 310/71 |

FOREIGN PATENT DOCUMENTS

| | | |
|---|---|---|
| 0256769 | 2/1988 | European Pat. Off. |
| 0001234 | 1/1986 | Japan ............... 310/49 R |
| 60-224391 | 3/1986 | Japan. |

*Primary Examiner*—Steven L. Stephan
*Assistant Examiner*—Judson H. Jones
*Attorney, Agent, or Firm*—Evenson, McKeown, Edwards & Lenahan

[57] ABSTRACT

Small-size motors, particularly vehicle step motors in a system used to adjust vehicle parts, are connected directly with a housing in which an assigned electronic control system is housed. A bus supplies each of the motors or its associated electronic control system with adjusting commands and energy. The housings in which the electronic control systems are housed, are closed off tightly with respect to dust and dirt but not with respect to vapor, so that moisture can diffuse out of these housings. This arrangement permits a simple and operationally reliable construction.

8 Claims, 2 Drawing Sheets

SMALL-SIZE MOTOR AND A PROCESS FOR MANUFACTURE AND USE THEREOF

BACKGROUND AND SUMMARY OF THE INVENTION

The present invention relates to small-size motors and, more particularly to stepping and servo motors that may be used in a motor vehicle to adjust various vehicle parts, and to methods of manufacturing and using the same.

Small-size motors, particularly step motors and servomotors, are being used increasingly, in some cases in considerable numbers, for the adjustment or setting of system elements such as are found in motor vehicles. This use partially takes place under extreme conditions, for example, in automobile construction, where the motors must operate reliably under considerable temperature fluctuations in a dusty, dirty, damp and even wet environment. Usually, such small-size motors, particularly step motors, are controlled by a central electronic control system which generally requires an at least four-conductor cable connection from the central electronic system to each motor and is therefore connected with considerable expenditures. In addition, a considerable number of connecting points are required, and these points are frequently the cause of interruptions and, therefore, of operational failures.

It is an object of the present invention, therefore, to simplify control and cabling and, therefore, to make the motor operationally more reliable.

It is a further object of the invention to configure the motor such that it operates reliably in a continuous manner also under extreme operating conditions, for example, in the engine compartment of a motor vehicle.

According to a presently contemplated embodiment of the present invention, these objects have been achieved by arranging an electronic control system directly with the motor. As a result, a secure and direct connection is achieved between the electronic system and the motor without any cabling, and the cabling can be simplified in that the individual motors are controlled by a central electronic control system by way of a databus and may be supplied with energy by way of parallel or joint conductors. Instead of a large number of cables which are laid in a star shape from the electronic control system to the individual motors, a single cable, which in general has no more than three leads, can be guided along the shortest path from the central electronic control system to all motors.

The electronic control system is preferably housed in a plastic housing which is firmly connected with the coil form of the motor. This housing is preferably provided with an end element which is not sealed hermetically and which, although it prevents dust and dirt from entering into the housing compartment, permits a sufficient vapor exchange in order to permit condensed water formed in the housing to evaporate and discharge.

BRIEF DESCRIPTION OF THE DRAWINGS

These and further objects, features and advantages of the present invention will become more readily apparent from the following detailed description of several currently preferred embodiments when taken in conjunction with the accompanying drawings wherein.

DETAILED DESCRIPTION OF THE DRAWINGS

Figure 1:
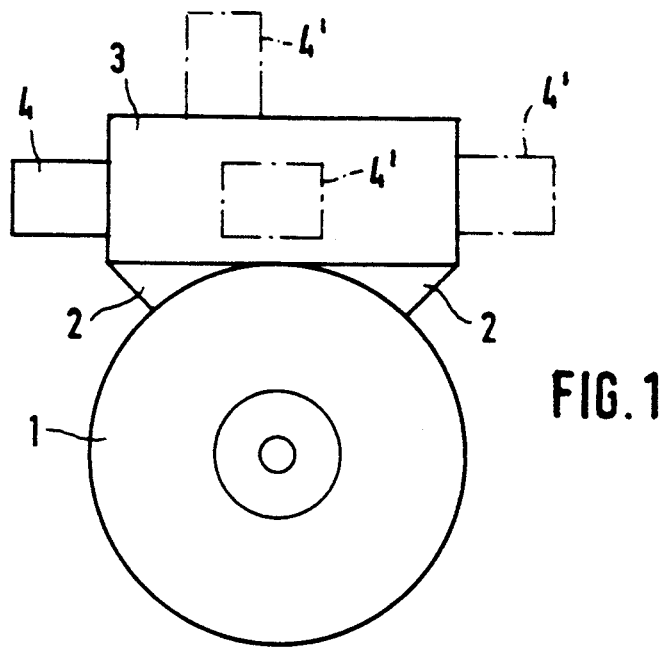
FIG. 1 is a schematic representation of the small-size step motor according to one embodiment of the present invention.

In the small-size step motor 1, shown in FIG. 1, the coil form 2, which is made of plastic, is provided with one or several connecting extensions which reach through the stator parts of the motor and with which a plastic housing 3 is firmly connected by, for example, gluing or fusing. This plastic housing 3 is used for receiving an electronic control system for the motor 1, and it is equipped with a connection bush 4 for a cable plug. It is indicated by dash-dotted lines that housing parts may be provided which are equipped with connection bushes 4' at different points in order to be able to select the most favorable position of this connection bush for all applications.

Figure 2:
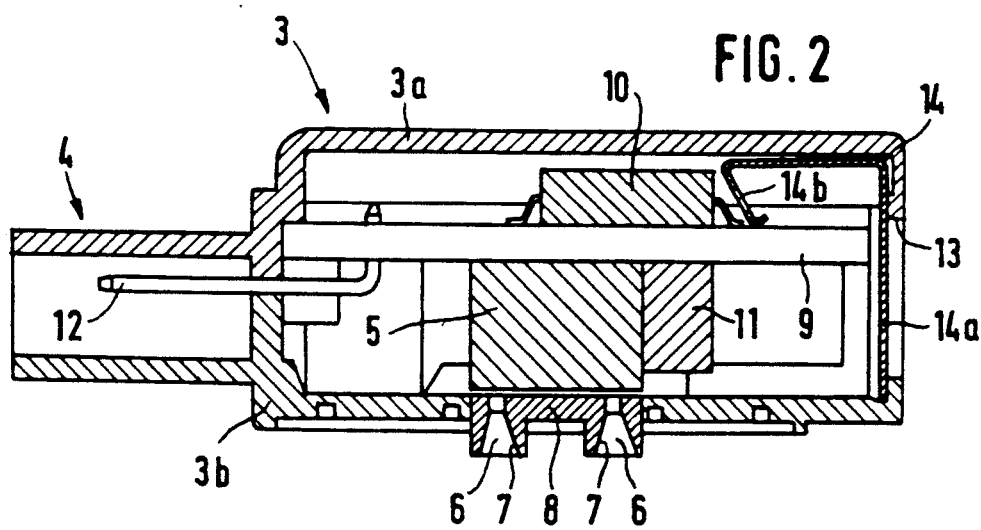
FIG. 2 is a cross-sectional elevational view of one embodiment of a housing in accordance with the present invention for accommodating the electronic control system.

FIG. 2 is a longitudinal sectional view of one embodiment of the housing 3 with the electronic control system shown schematically in FIG. 1. The housing 3 comprises a housing top part 3a and a housing bottom part 3b which is, for example, fused thereto. In the housing bottom part 3b, a connection body 5 is disposed therein, and contacts are situated to form a plug-type connection with connection pins 6 of the motor coil form (not shown in FIG. 2). These connection pins 6 penetrate conical guiding bushes 7 of a guiding part 8.

A printed circuit board 9 is held between the two housing parts 3a, 3b, to which an integrated circuit 10 and a switching element, or possibly a cooling element 11, of the electronic control system is connected. Connection pins 12 project into the connection bush 4 and are soldered to the printed circuit board 9. Multiple contact pins 12, e.g. three, may be provided, although only one is shown in FIG. 2. A lateral housing opening 13 is closed off by the flat leg 14a of an L-shaped leaf spring 14. The end of the leaf spring 14 rests elastically on the printed circuit board. The leaf spring 14 is divided in a comb-like manner into several teeth 14b, in which case these teeth are dimensioned and arranged such that they reach between strip conductors of the printed circuit board 9.

The leaf spring 14 forms a not-completely hermetic or steam-tight closing of the housing 3, but is sufficient, however, for preventing dust, dirt or liquid from entering the housing while permitting but permits a certain vapor or steam exchange between the interior of the housing and the environment in order to permit condensation water or ice, which may have formed inside the housing 3, to evaporate and be discharged. In addition, the leaf spring 14 has the purpose of efficiently discharging heat from the printed circuit board 9 which may originate mainly from the motor drivers.

Figure 3:
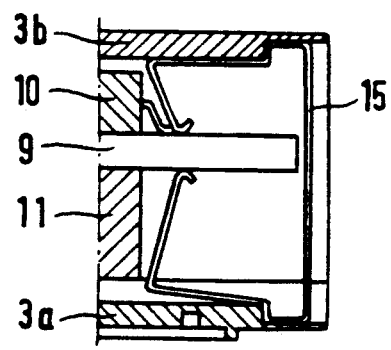
FIGS. 3 to 6 are cross-sectional elevational views similar to FIG. 2 but showing only the right end of the housing to illustrate other presently contemplated embodiments of the present invention.

FIG. 3 illustrates another embodiment of the present invention in which the corresponding parts have the same reference numbers as in FIG. 2 and therefore do not need to be described again. The closing element for the opening of the housing 3 is again constructed as a leaf spring 15 which, however, rests by way of spring ends against the top side and the bottom side of the printed circuit board 9 and thus ensures a still more intensive cooling of the electronic system.

Figure 4:
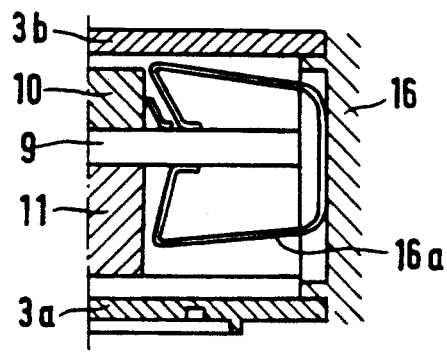

FIG. 4 illustrates still another embodiment of the present invention according to which the opening of the housing 3 is closed by a plastic lid 16 with which a leaf spring 16a is connected which is similar to that of FIG. 3 in that the ends of the spring 16a rest against the top and bottom side of the printed circuit board 9. This leaf spring is thus used both as a holding element for the lid 16 and for the cooling of the printed circuit board 9.

Figure 5:
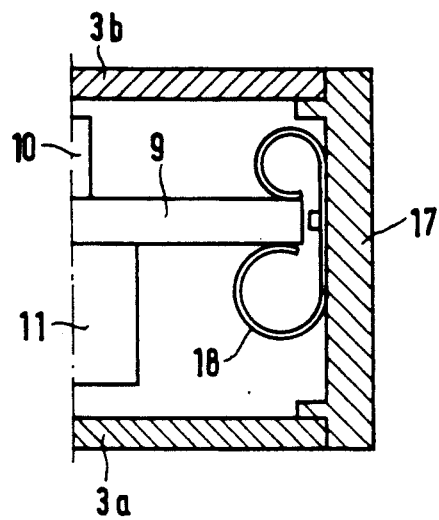

FIG. 5 illustrates a further embodiment of the present invention similar to that in FIG. 4 with a plastic closing element 17 but which is provided with a differently shaped leaf spring 18 as the holding and cooling element.

Figure 6:
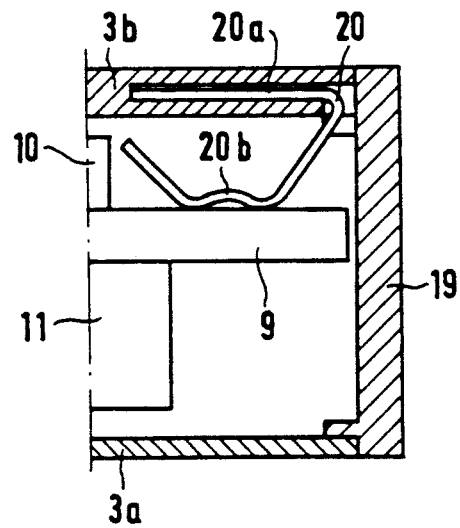

FIG. 6 illustrates yet another embodiment of the present invention with a plastic closing element 19 which is not connected with a holding spring but is glued or welded at spaced points to the housing 3. The leaf spring 20, has a W-shaped part 20b which rests on the printed circuit board 9 at two spaced points and therefore acts as a cooling element, and a leg 20 which is pushed into a deep groove of the housing top part 3b.

Figure 7:
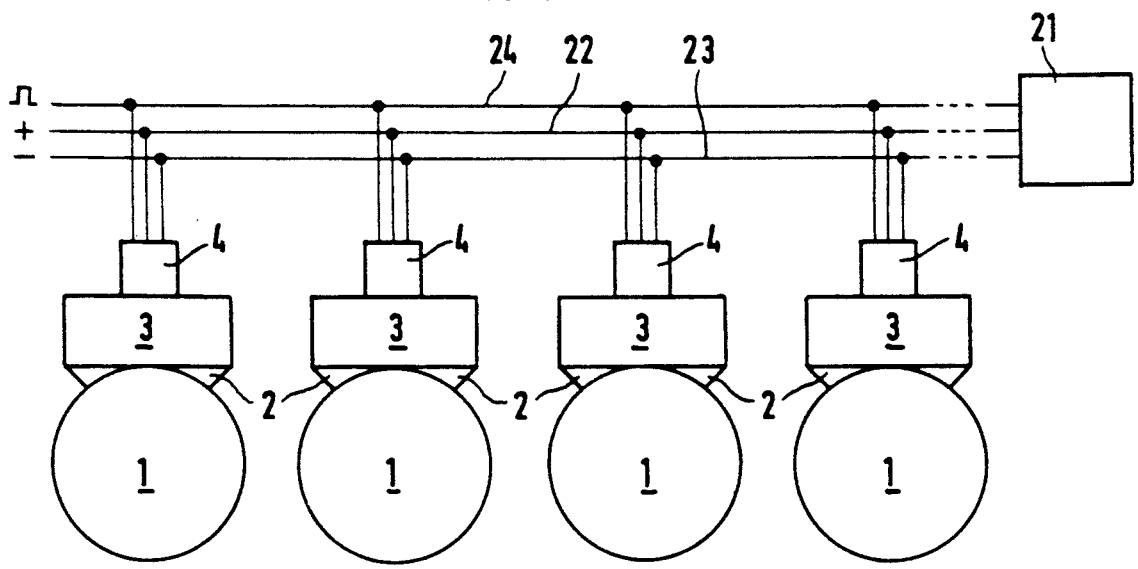
FIG. 7 is a schematic view of the cabling between several motors and a central electronic control system in accordance with the present invention.

FIG. 7 illustrates four small-size motors 1 which are controlled and fed by a common central electronic control system 21. The electronic control system is connected in parallel with a three-conductor bus cable. Two conductors 22, 23 of this cable are used for the energy supply of the motors with their electronic control system, while conductor 24 is used for signal transmission.

One of the conductors 22, 23 may be used for the return of the control signals. Only two conductors or, in an extreme case, only one conductor may be needed, specifically when the return or ground takes place by way of the mass, which is customary, for example, in vehicle construction. Control signals may then be transmitted and energy may be supplied by way of a single conductor. In the case of a single conductor, the electronic system of each motor has memory in which digitalized commands for the motor control can be stored. In addition, the electronic system of each motor has an individual address code, and the memories are activated when the corresponding address code is transmitted by the electronic control system 21. In this manner, each motor or the electronic system assigned to it can be activated individually in order to read command data into the memories and to control the assigned motor corresponding to these data.

Instead of the described measures for the cooling of the electronic system or in addition to it, a plastic part or the housing may be connected to be in close contact with the printed circuit board. The connection bush 4 and the connection pins 12 may also be used for additional cooling. Also, a heat-conducting rubber may be clamped between the printed circuit board and the housing. However, in all instances, care must be taken that the heat exchange and moisture discharge are ensured.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A small-size motor comprising one of a step motor and a servomotor, and an electronic control system assigned directly to the motor, wherein a plastic housing for housing the electronic control system is one of glued or fused with a coil form of the motor, and a plug-type connection exists between the electronic system and winding connections of the motor.

2. The motor according to claim 1, wherein a closing element closes off the housing to prevent entry of foreign material into the housing and to allow vapor to be evaporated from the housing.

3. The motor according to claim 1, wherein at least one portion of the housing, connected with the electronic control system to provide heat conduction for cooling purposes.

4. The motor according to claim 3, wherein the at least one portion comprises a closing element, and the electronic control system comprises a printed circuit board.

5. The motor according to claim 4, wherein a closing element closes off the housing to prevent entry of foreign material into the housing and to allow vapor to be evaporated from the housing.

6. The motor according to claim 3, wherein one of a metallic closing element and a metallic holding element is arranged in the housing to rest elastically against the printed circuit board.

7. The motor according to claim 1, wherein a heat-conducting, electrically insulating material is inserted between the electronic control system and a wall of the housing.

8. The motor according to claim 1, wherein the electronic control system comprises memory for driving commands activatable by an address code.

* * * * *